United States Patent Office 2,754,940
Patented July 17, 1956

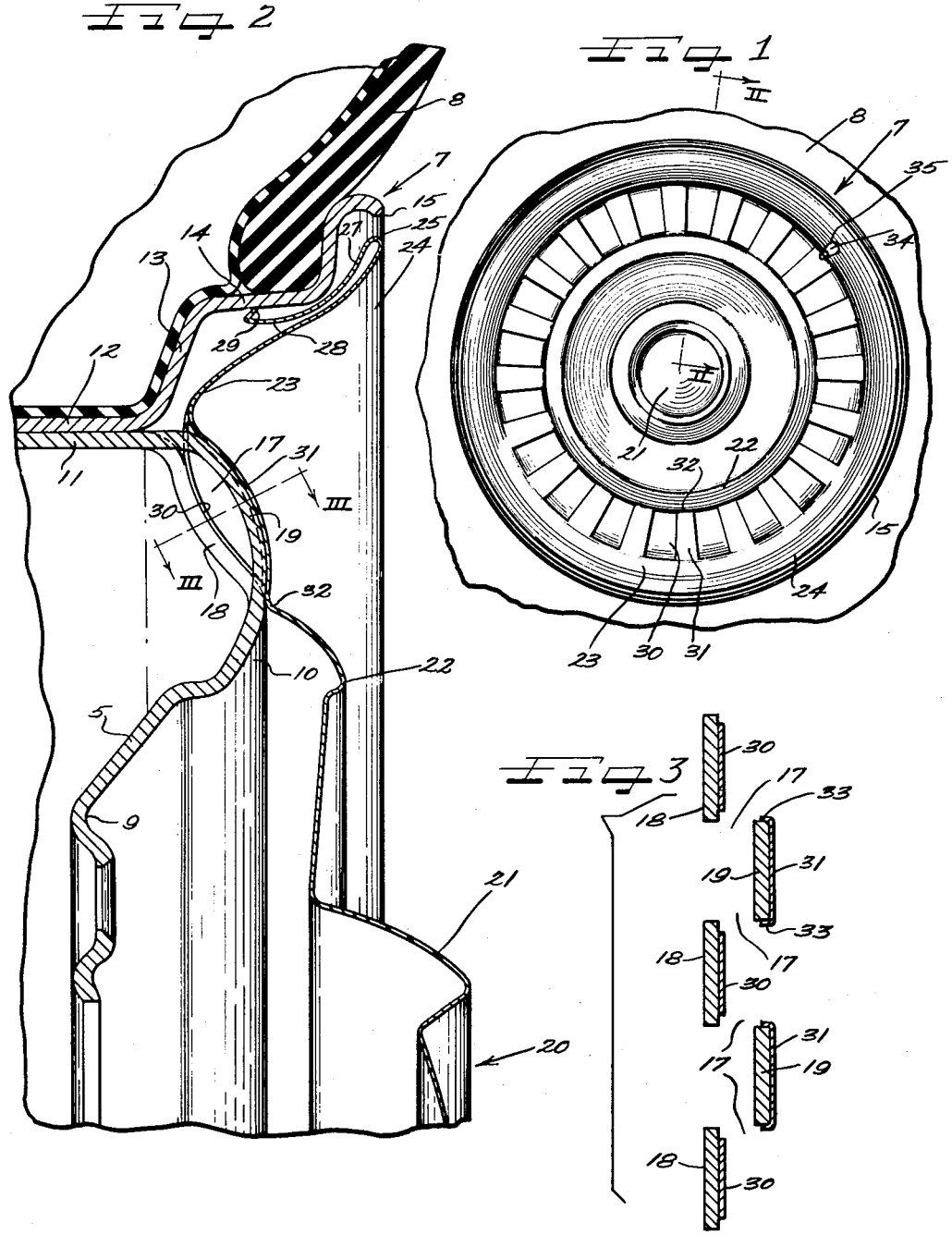

2,754,940

WHEEL STRUCTURE

George Albert Lyon, Detroit, Mich.

Application February 18, 1954, Serial No. 411,146

9 Claims. (Cl. 188—264)

The present invention relates to improvements in wheel structures and more particularly concerns wheel structures of the type enabling circulation of air therethrough.

An important object of the present invention is to provide a wheel structure having provision for large volume air circulation therethrough and provided with an ornamental and protective cover for the outer side of the wheel.

Another object of the invention is to provide a novel wheel structure and cover combination.

A further object of the invention is to provide an improved wheel structure wherein a cover has complementary spoke-like structure to the wheel body affording substantial air circulation openings through the wheel and cover.

Still another object of the invention is to provide an improved wheel cover for disposition at the outer side of a vehicle wheel provided with improved means for air circulation through the cover and the wheel.

Other objects, features and advantages of the present invention will be readily apparent from the following detailed description of a preferred embodiment thereof taken in conjunction with the accompanying drawing in which:

Figure 1 is an outer face elevational view of a wheel structure embodying features of the invention;

Figure 2 is an enlarged radial sectional view taken substantially on the line II—II of Figure 1; and Figure 3 is a fragmentary transverse sectional detail view taken substantially on the line III—III of Figure 2.

The present invention is especially directed to wheel structures including a disk spider wheel body 5 supporting a tire rim 7 of the multi-flange, drop center type adapted to support a pneumatic tire and tube assembly 8. The wheel body 9 includes a central dished bolt-on flange 9, and an annular, intermediate axially outwardly directed reinforcing nose bulge 10 which merges at its radially outer side with an axially inwardly directed annular attachment flange 11 secured in any suitable manner such as by welding or riveting to a base flange 12 of the tire rim 7. From the base flange extends a generally radially outwardly and axially outwardly sloping side flange 13 which merges with a generally axially outwardly and diagonally generally radially outwardly sloping intermediate flange 14 leading into a generally radially outwardly and then axially outwardly turned terminal flange 15 of the tire rim.

For circulation of air through the wheel body 5, the nose bulge 10 is provided at the radially outer side thereof with a series of generally circumferentially directed openings 17 of substantial number provided by radially slitting the nose bulge from juncture with the attachment flange 11 to a preferred extent radially inwardly at preferably uniformly spaced intervals and then having the generally spoke-like radially extending portions of the nose bulge intermediate the slits bowed generally radially and axially inwardly to provide strap-like inner spoke portions 18 and bowed generally radially and axially outwardly to provide spoke-like strap portions 19 alternating with the portions 18. In this manner, the cover is provided with aggregate large wheel opening cross-sectional area for air circulation while from the front of the cover the openings 17 are substantially concealed. It should also be noted that inasmuch as the openings 17 are formed in the radially outer side of the nose bulge 10 which is directed generally forwardly in the forward rotation of the wheel at the forward side of the wheel, while at the rear side of the wheel while it is turning the radially outer side of the nose bulge is directed rearwardly, air circulation is substantially facilitated through the openings 17 as the wheel turns. Moreover, since in the formation of the openings 17, none of the material of the cover is removed, but actually the material of the cover as seen in the alternately oppositely bowed spoke-like portions 18 and 19 provides closely mutually cooperating struts connecting the attachment flange 11 to the nose bulge 10 and the remainder of the wheel body, the wheel body is actually strengthened.

For covering the outer side of the wheel, a wheel cover 20 is provided which in the present instance is shown as comprising a full disk cover made from a single piece of sheet material such as stainless steel, brass or the like and which may be stamped and drawn to form and polished and plated to provide a highly attractive ornamental appearance for the outer side of the wheel. In the present instance, the cover 20 comprises a central crown portion 21 adapted to overlie the wheel body and more particularly the attachment flange 9 thereof. An annular reinforcing rib 22 extends generally axially outwardly about the base of the crown 21 and slopes at its radially outer side into an annular dished intermediate cover portion 23 which is dimensioned to extend generally into the relatively large annular groove-like depression between the wheel body and the tire rim. From the dished intermediate portion 23 the margin of the cover extends generally radially and axially outwardly to provide a continuous annular marginal portion 24 which substantially overlies the tire rim and has a turned extremity 25 adapted in assembly to lie adjacent to the tip of the terminal flange 15 of the tire rim. From the turned extremity 25 extends an underturned generally radially and axially inwardly directed flange 27 having thereon a series of cover retaining fingers 28 of suitable number and peripheral spacing extending generally axially inwardly and provided with short and stiff generally radially and axially outwardly retaining terminals 29 which are engageable with the intermediate flange 14 in retaining gripping relation by pressing the cover axially inwardly into position on the wheel. To remove the cover from the wheel a pry-off tool is inserted behind the outer extremity 25 and pry-off force applied to effect release of the retaining fingers from the intermediate flange of the tire rim.

To cooperate with the spoke-like portions 18 and 19 of the wheel body, the cover 20 has at the radially inner side of the intermediate dished portion 23 thereof a uniform series of generally radially and axially inwardly bowed spoke-like portions 30 and alternating generally radially and axially outwardly bowed spoke-like portions 31 generally complementary to and cooperatively related to respectively the wheel body spoke-like portions 18 and 19. In assembly on the wheel, the cover spoke-like portions 30 nest into the concave outer faces of the respective wheel body spoke-like portions 18, while the cover spoke-like portions 31 nest upon the convex outer faces of the wheel body spoke-like portions 19. By preference, a rigidifying reinforcing rib 32 is provided in the cover at juncture of the radially inner ends of the strap-like spoke portions 30 and 31 with the contiguous radially inner portion of the cover. At the radially outer ends of the cover spoke portions 30 and 31, the contiguous continuous annular concave convex section of the intermediate portion 23 of the cover in effect provides a rigidifying reinforcing rib.

Since the cover spoke-like portions 30 and 31 are severed from one another similarly as the wheel spoke-like portions 18 and 19 are severed from one another along radial lines, the wheel openings 17 are fully exposed for air circulation therethrough when the cover is assembled on the wheel.

By preference, the inwardly dished spoke-like portions 30 are narrower than the outwardly dished spoke-like portions 31 to a sufficient extent so that the side margins of the spoke-like portions 31 will extend beyond the side edges of the wheel spoke-like portions 19. The laterally extending side margins of the cover spoke-like portions 31 are turned axially inwardly to provide reinforcing and finishing flanges 33 which overlap the side edges of the wheel spoke-like portions 19 and thus provide finishing cover for such edges. In addition, by the overlapping covering relation of the flanges 33 to the edges of the spoke-like portions 19, the cover is quite effectively held against any possibility of relative rotary movement on the wheel as might otherwise result from torque forces in running of the wheel in operation. Thereby, any danger of distorting a valve stem 34, which projects from the tire and tube assembly 8 through the tire rim in the usual manner and through a valve stem opening 35 in the marginal cover portion 24, in operation is prevented.

When viewed from the outer side, the wheel structure, as best seen in Figure 1, appears to have a series of generally radially outwardly and axially inwardly sloping spokes but the wheel openings 17 are substantially concealed while nevertheless in the aggregate providing quite large cross-sectional air flow area through the cover and the wheel. This is especially beneficial where the wheel is used on vehicles having large braking surfaces on the brakes which are usually housed immediately inside the wheel and therefore will be cooled by air moving through the wheel structure.

It will be understood that modifications and variations may be effected without departing from the scope of the novel concepts of the present invention.

I claim as my invention:

1. In a wheel structure including a tire rim and a wheel body having a series of generally radially extending alternately generally axially inwardly and outwardly dished spoke-like portions affording therebetween substantial air circulation openings through the wheel body, a cover for disposition at the outer side of the wheel comprising a cover body for substantially concealing the wheel and provided with a series of generally complementary generally axially inwardly and outwardly dished spoke portions for overlying the spoke portions of the wheel body and affording openings through the cover complementary to the openings through the wheel body, and means for retaining the cover on the wheel.

2. In a wheel structure including a tire rim and a wheel body supporting the tire rim and having a generally axially inwardly extending flange attached to the tire rim, and with the portion of the wheel body contiguous the attachment flange formed into a series of generally axially inwardly and outwardly alternating dished spoke-like portions defining air circulation openings therebetween, a cover for the outer side of the wheel having an inner circular portion for overlying the wheel body and an outer circular portion for overlying the tire rim and an intermediate portion provided with a series of alternating generally axially inwardly and outwardly dished spoke-like portions generally complementary to the spoke-like portions of the wheel body and overlying the same cooperatively and affording openings through the cover complementary to the openings through the wheel, and means for retaining the cover on the wheel.

3. In a wheel structure including a tire rim and a wheel body supporting the tire rim and having a generally axially inwardly extending flange attached to the tire rim, and with the portion of the wheel body contiguous the attachment flange formed into a series of generally axially inwardly and outwardly alternating dished spoke-like portions defining air circulation openings therebetween, a cover for the outer side of the wheel having an inner circular portion for overlying the wheel body and an outer circular portion for overlying the tire rim and an intermediate portion provided with a series of alternating generally axially inwardly and outwardly dished spoke-like portions generally complementary to the spoke-like portions of the wheel body and overlying the same cooperatively and affording openings through the cover complementary to the openings through the wheel, said outer portion of the cover having means behind the margin thereof for attaching the cover to the wheel by cooperation with the tire rim.

4. In a wheel structure including a tire rim and a wheel body supporting the same, the wheel body comprising a disk spider having an intermediate axially outwardly extending nose bulge and a marginal flange attached to the tire rim with a series of generally radially extending inwardly and outwardly respectively dished spoke-like portions at the radially outer side of the nose bulge and extending to juncture with the attachment flange and facing generally radially outwardly, a cover for disposition at the outer side of the wheel and for substantially covering the wheel and having an intermediate portion provided with generally radially outwardly facing and alternately inwardly and outwardly dished spoke-like portions generally complementary to the spoke-like portions of the wheel body and cooperating therewith to provide openings through the cover complementary to the openings through the wheel body, and means for retaining the cover on the wheel.

5. In an air circulation wheel structure including a wheel body provided with relatively generally axially offset alternating spoke-like portions defining openings through the wheel body, a cover for disposition over the wheel and including a body having relatively generally axially offset alternating spoke-like portions defining openings through the cover body substantially concealed from the outer side of the cover and adapted to cooperate with the spoke-like portions of the wheel body, and means for retaining the cover on the wheel.

6. In a vehicle wheel having a wheel body provided adjacent the radially outer margin thereof with generally radially extending and axially inwardly and outwardly alternating spoke-like portions defining therebetween wheel openings, a cover for disposition over the wheel including a body comprising a central circular portion and an outer marginal circular portion with an intermediate portion provided with spoke-like portions generally complementary to the spoke-like portions of the wheel body and cooperable therewith to provide for air circulation through the cover complementary to the openings through the wheel body, and means for retaining the cover on the wheel.

7. In a cover for disposition at the outer side of a vehicle wheel, a cover body with inner and outer faces and having an inner circular portion and an outer circular portion and an intermediate dished portion with a series of alternately inwardly and outwardly directed generally radially outwardly facing spoke-like portions providing therebetween air circulation openings through the cover.

8. In a wheel structure including a wheel body having a series of radially outwardly arched spoke-like portions joining an attachment flange at the radially outer margin of the wheel body, a cover for disposition at the outer side of the wheel having a plurality of radially extending spoke-like portions complementary to the spoke-like portions of the wheel body and provided with side flanges cooperating with the side edges of the spoke-like portions of the wheel body to hold the cover against turning on the wheel, and means for retaining the cover on the wheel.

9. In a wheel structure including a tire rim and a wheel body having inner and outer sides and provided adjacent to the tire rim with a series of inwardly bowed and outwardly bowed alternating spoke-like portions defining therebetween wheel openings, a cover for disposition at the outer side of the wheel having a series of inwardly bowed and outwardly bowed spoke-like portions generally complementary to the spoke-like portions of the wheel body and inter-nested therewith and providing openings through the cover cooperating with the openings through the wheel for air circulation, and means for retaining the cover on a wheel.

References Cited in the file of this patent

UNITED STATES PATENTS

| | | |
|---|---|---|
| 1,386,405 | Hills | Aug. 2, 1921 |
| 1,931,946 | Zerk | Oct. 24, 1933 |
| 1,958,484 | Lyon | May 15, 1934 |
| 2,092,975 | Hunt et al. | Sept. 14, 1937 |
| 2,161,904 | Sinclair | June 13, 1939 |
| 2,624,635 | Lyon | Jan. 6, 1953 |